RISE-TIME AMPLIFIER EMPLOYING AN IMPACT IONIZATION DEVICE

Filed Dec. 15, 1958

INVENTORS
ROBERT D. GOLD,
LOUIS PENSAK &
MARTIN C. STEELE
BY Milton S. Winters
ATTORNEY United States Patent Office 3,012,154

Patented Dec. 5, 1961

3,012,154

RISE-TIME AMPLIFIER EMPLOYING AN IMPACT IONIZATION DEVICE

Robert D. Gold, New Brunswick, and Louis Pensak and Martin C. Steele, Princeton, N.J., assignors to Radio Corporation of America, a corporation of Delaware Filed Dec. 15, 1958, Ser. No. 780,290

5 Claims. (Cl. 307—88.5)

This invention relates primarily to diode amplifiers and logic circuits, and more particularly, although in its broadest aspects not exclusively, to rise-time controlled diode amplifiers which depend for their operation on the sharp change in resistivity of certain types of semiconductors under predetermined conditions of ambient temperature and applied electric field.

There is a need in the information handling field for circuits capable of very high speed response and recovery. Computers, for example, are called upon to handle vast quantities of information in a relatively short time period. The operating speed of such machines is limited, in part, by the speed of response and recovery of the various circuits and components used therein. Many logical operations are presently performed in a computer by circuits which depend for their operation on the non-linear characteristics of various passive elements (normally called diode logic). Most such circuits are characterized by signal attenuation which limits their usefulness in some applications.

It is an object of the present invention to provide a novel diode amplifier.

It is another object of the present invention to provide a high speed logic circuit.

It is still another object of the present invention to provide a high speed logic circuit having gain.

Yet another object of the present invention is to provide a diode amplifier circuit capable of performing logical operations at high speed.

Experimental work in the field of cryogenics has indicated the utility of superconducting elements in certain computer applications. Superconducting rings, for example, may be used as the basic components of a memory. As is known, a superconductor is a current-sensitive element which has substantially zero resistance. In order that such devices may be efficiently supplied with information signals in the form of current pulses, they must be supplied from a low impedance source.

It is a further object of the present invention to provide a current amplifier which has a very low output impedance.

Yet another object of the present invention is to provide a high speed logic circuit which has a very low output impedance.

A further object of the present invention is to provide a diode amplifier having a low output impedance and capable of performing logical operations.

Most semiconductors display a marked increase in resistivity at low temperatures. This is particularly true for semiconductors of the extrinsic type whose electrical properties depend upon the presence of impurity substances defined in the art as donor and acceptor impurities. Such behavior is due to the decrease in the number of mobile charge carriers available at low temperatures. Most of the carriers become reattached to the impurity atoms when the thermal energy becomes considerably less than the impurity activation energy. In general, the remaining carriers may attain very high mobilities at such low temperatures. Mobility is a parameter of a charge carrier under the influence of an electric field, and is defined as the ratio of the charge carrier drift velocity to the electric field.

In a semiconductor in a condition of high mobility, a relatively small electric field of the order of a few volts per centimeter can impart enough energy to the electric charge carriers, holes or electrons, to cause impact ionization of the donor impurities in the case of electrons and of the acceptor impurities in the case of holes. The term "impact ionization," as used here, refers to a known phenomenon in which an atom of impurity substance loses an electron or hole and becomes an ion when struck by a charge carrier moving under the stimulus of an electric field. When impact ionization occurs, the resistivity of the semiconductor decreases sharply due to the sudden increase in the number of electric charge carriers. This sharp change in resistivity, which is defined as the breakdown of the semiconductor, results in a non-linearity in the current-voltage characteristic of the semiconductor. The sudden decrease in resistivity causes a substantial increase in the flow of current through the semiconductor and over the electrical path in which the semiconductor is located.

When an electric field having a magnitude sufficient to cause breakdown is suddenly applied between two electrodes of a semiconductor of the type described, the resulting current does not immediately attain a maximum value; a finite time interval is required during which charge carriers are generated at a substantially exponential rate, and during which the resistivity of that portion of the semiconductor between the electrodes decreases correspondingly. This time interval (which in some cases may be of the order of a millimicrosecond) is a function of the voltage gradient and other factors, and is shorter when the magnitude of the applied electric field is larger.

The present invention makes use of the current build-up, or rise-time characteristic of an impact ionization semiconductor to produce amplification. In accordance with one embodiment of the invention, a body of semiconducting material of the type described is provided with two ohmic contact electrodes. An output load of low resistance value, a clock pulse means, and an input pulse means are serially connected between the two electrodes. The semiconductor is immersed in a suitable low temperature environment. The clock pulses are of sufficient amplitude to cause impact ionization; however, the clock pulse duration is adjusted so that the current can only build up to a very small value during the clock pulse duration. When an input pulse to be amplified also is applied, the combined electric field is of sufficient magnitude to cause substantial current build-up during the clock pulse duration, and a large output current obtains.

The foregoing and other objects, advantages and novel features of this invention, as well as the invention itself, both as to its organization and mode of operation, may be best understood from the following description when read in connection with the accompanying drawing in which like reference numerals refer to like parts and in which.

Figure 1:
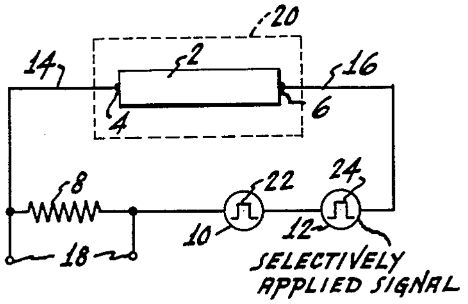
FIGURE 1 is a schematic diagram of a diode amplifier according to the present invention.

A rise-time controlled diode amplifier in accordance with the present invention is illustrated in FIGURE 1. A body 2 of extrinsic type semiconductive material is provided with a pair of ohmic contact electrodes 4, 6. The series combination of an output load 8 (illustrated as a resistor), a clock pulse means 10, and a pulse input means 12 is connected by leads 14, 16 to the ohmic contact electrodes 4, 6, respectively. The output developed across the load 8 may be derived from a pair of output terminals 18. The clock pulse means 10 and the pulse input means 12 are illustrated diagrammatically in FIGURE 1. In practice, the pulses may be applied to the circuit by any suitable means, such as transformers. The operation of the amplifier will be described hereinafter. The clock pulses 22 are preferably applied periodically. The input pulses 24 may be selectively applied as desired, and the presence of an input pulse may, for example, correspond to a binary "one" and the absence of an input pulse may correspond to a binary "zero."

The semiconductive material is preferably of the type which has a relatively steep resistivity versus temperature characteristic and which exhibits a sharp change in resistivity under certain conditions of applied voltage and ambient temperature. Crystalline semiconductive materials, such as N or P-types of germanium are among the types of materials which are suitable. The electrodes 4, 6 may be connected to the semiconductor body 2 by any of several well-known techniques, such a soldering to vapor-deposited metal coatings on the body 2, or to coatings formed of a cured silver paste, or by alloying to the body 2.

The body 2 of semiconductive material is located in a low temperature environment, indicated schematically by the dashed box 20. The dashed box 20 may be a liquid helium cryostat or other means for maintaining the body 2 at a low temperature. Liquid helium liquifiers are commercially available as are double Dewar flasks which use liquid nitrogen in the outer Dewar and liquid helium in the inner Dewar, and which may lose less than one percent of their liquid helium per day. When a material such as germanium is used as the semiconductor, an upper temperature limit of 25°–30° Kelvin (K.) is feasible, although lower temperatures may be employed. It is believed unnecessary to discuss in detail the known means for maintaining the body 2 of semiconductive material at a low temperature. These are described in general in an article entitled, "Low Temperature Electronics," in the Proceedings of the I.R.E., volume 42, pages 408, 412, February 1954, and in other publications.

Figure 2:
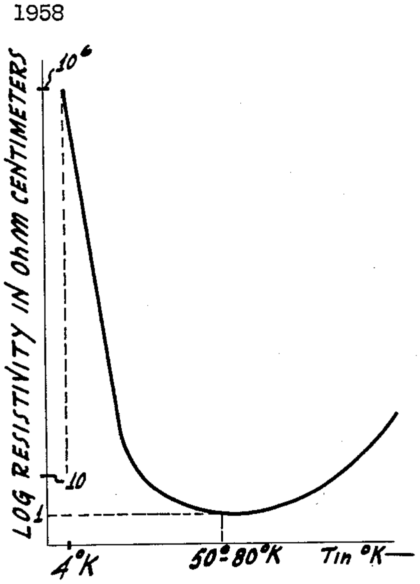
FIGURE 2 is a graph illustrating the variation of resistivity with temperature for a semiconducting material, such as germanium.

The graph of FIGURE 2 shows, in general, how the resistivity of a body of semiconducting material, such as germanium, varies with temperature in the presence of an electric field of lesser magnitude than that required to produce breakdown. Absolute temperature T is plotted as the abscissa, and the logarithm of resistivity is plotted as the ordinate. At room temperature, the sample of germanium has a resistivity of approximately 28 ohm-centimeters. The resistivity reaches a minimum value of about 1 ohm-centimeter at a temperature of 50–80° K. and then rises rapidly to approximately $10^6$ ohm-centimeters at about 4° K. The large increase in resistivity at low temperatures is due to the recombination with the impurity atoms of the vast majority of mobile charge carriers which are presently at the higher temperatures. When an electric field of sufficient amplitude is applied to the sample after its temperature has ben adjusted to a value at which breakdown can occur, the remaining few charge carriers obtain such high velocities from the electric field that they cause impact ionization of the donors or acceptors. When this occurs, the resistivity, which may be of the order of $10^6$ ohm-centimeters (the exact value depending upon the temperature of the sample prior to breakdown and the impurity concentration) changes extremely sharply to a very low value of the order of 10 ohm-centimeters. This is illustrated in the drawing by the dashed vertical line at approximately 4° K.

Figure 3:
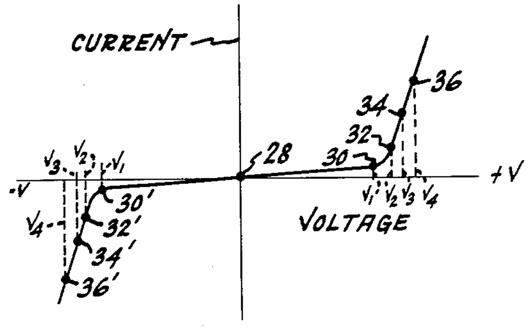
FIGURE 3 is a graph showing the relationship of current to voltage for a body of relatively uncompensated, extrinsic type germanium cooled to a temperature at which impact ionization can occur.

This breakdown phenomenon also is demonstrated by the current-voltage characteristic of a semiconductor whose temperature has been adjusted to a value at which impact ionization can occur. FIGURE 3 is such a characteristic for a sample of uncompensated, extrinsic type germanium. During the portion 28, 30 of the curve, the resistivity of the material is very high, and very little current flows in response to an applied voltage of lesser magnitude than $V_1$. However, the resistivity changes sharply when the breakdown point 30 is exceeded, and a small increase in voltage above $V_1$ produces a substantial increase in current. Operating points 32, 34 and 36 correspond, respectively, to applied voltages $V_2$, $V_3$ and $V_4$. It should be noted that negative voltages of corresponding magnitude cause corresponding currents to flow in the opposite direction. The device is symmetrical and can amplify voltage pulses of positive and negative polarities.

As mentioned previously, the current does not immediately attain a maximum value when a voltage pulse of breakdown amplitude is applied suddenly between two electrodes affixed to the body of material. A finite time interval, which may be as short as a millimicrosecond, is required during which the current builds up at a substantially exponential rate as increasing numbers of charge carriers are generated. The rise time is a function of the voltage gradient which, in turn, depends upon the amplitude of the applied voltage pulse. This is demonstrated by the family of curves of FIGURE 4.

Figures 4, 5:
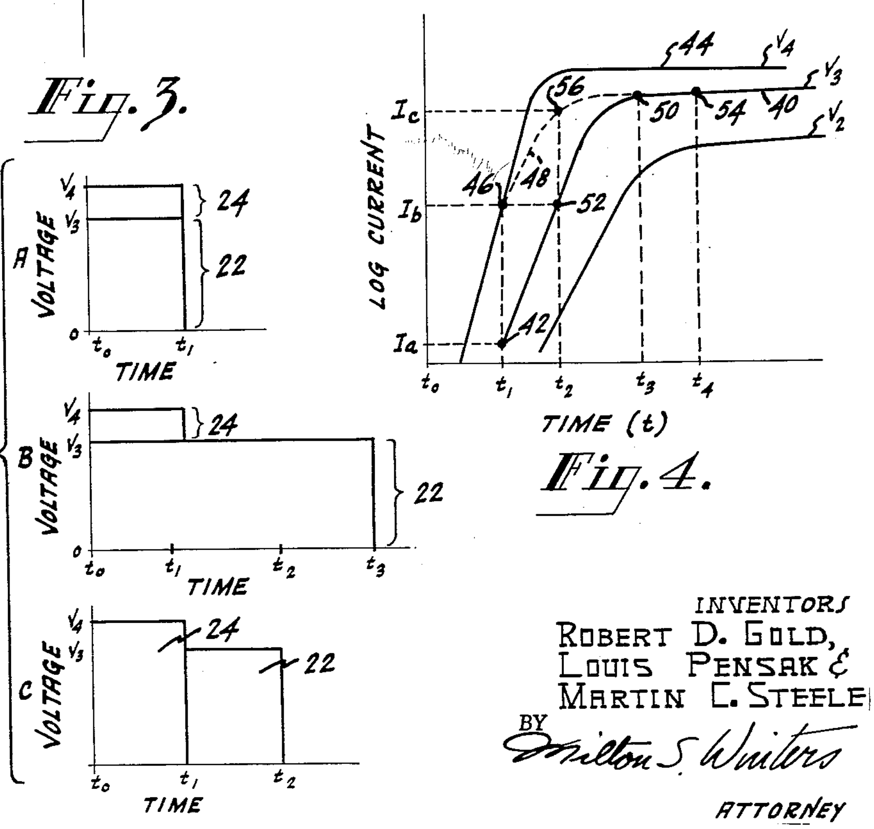
FIGURE 4 is a family of curves illustrating the current rise-time characteristic of an impact ionization diode for various magnitudes of applied voltage.
FIGURE 5 is a set of graphs illustrating certain combinations of input and clock pulses.

The logarithm of current is plotted in FIGURE 4 as a function of time for the voltages $V_2$, $V_3$, $V_4$ shown in FIGURE 3. As may be seen by referring to FIGURE 3, the breakdown voltage $V_1$ is very large compared to the increments between voltages $V_2$, $V_3$ and $V_4$. That is to say, a small voltage increment produces a large change in current once the breakdown voltage is exceeded. This is especially true in the rise-time region of the current-time characteristic. The curves of FIGURE 4 are for a sample of uncompensated, extrinsic, N-type material. It is believed that the same phenomenon exists for compensated, extrinsic type materials, which may be defined as semiconductive materials which have been doped with both donor and acceptor impurities.

The operation of the diode amplifier of FIGURE 1 may be best understood with reference to FIGURES 4 and 5. Assume that it is desired to amplify an input pulse 24 of amplitude $V_4 - V_3$ and duration $t_1$. This pulse is of a lesser amplitude than that required to produce breakdown. Consequently, very little current builds up in response to the input pulse alone. In like manner, when a clock pulse 22 of amplitude $V_3$ and duration $t_1$ is applied across the diode in the absence of an input pulse 24, the current only builds up to a small value. The amplitude $V_3$ of the clock pulse 22 is sufficient to cause breakdown, but the time duration $t_1$ does not permit substantial generation of charge carriers. The rise time characteristic for the clock pulse 22 of amplitude $V_3$ is illustrated in FIGURE 4 by the curve 40. At time $t_1$, the point 42 is reached corresponding to a current $I_a$. Consider now the result of applying the input pulse 24 and the clock pulse 22 in simultaneity, as illustrated in FIGURE 5(*a*). The resulting voltage across the diode is of amplitude $V_4$, and the current builds up in accordance with curve 44. At time $t_1$, the current reaches the point 46 corresponding to a current $I_b$. The current difference $(I_b - I_a)$ represents amplification of the input pulse 24. This difference is even more substantial than appears from the drawing; it should be noted that the logarithm of current is plotted in FIGURE 4.

It is not necessary that the duration of the input pulse 24 be the same as that of the clock pulse 22. By way of example, assume now that a clock pulse of amplitude $V_3$ and duration $t_3$ is applied to the diode together with an input pulse of amplitude $V_4 - V_3$ and duration $t_1$, as illustrated in FIGURE 5(*b*). The current build-up follows the curve 44 during the time interval from $t_0$ to $t_1$, and reaches the point 46 at time $t_1$. The input pulse 24 is then removed, and the current builds up along the dashed curve 48 during the interval from $t_1$ to $t_3$, reaching the point 50 at $t_3$. Since during the time interval $t_1$ to $t_3$ the current builds up in response to a voltage of magnitude $V_3$, the slope of the dashed curve 48 is the same as that of the curve 40 between points 52 and 54, the interval $t_4-t_2$ being equal to $t_3-t_1$. In like manner, the current build-up will reach the point 56 in response to an input pulse 24 of $V_4-V_3$ and duration $t_1$ applied with a clock pulse 22 of amplitude $V_3$ and duration $t_2$.

The operation of the diode amplifier has thus far been described in response to an input pulse 24 applied during the duration of the clock pulse 22. The input pulse may also either precede or follow the clock pulse if the input pulse itself is of sufficient magnitude to cause breakdown. Consider now the operation of the amplifier in response to an input pulse of amplitude $V_4$ and duration $t_0$ to $t_1$ followed by a clock pulse of amplitude $V_3$ applied for the interval $t_1$ to $t_2$ as illustrated in FIGURE 5(*c*). Current builds in accordance with curve 44 during the interval $t_0$ to $t_1$ and reaches a value $I_b$, corresponding to point 46, at $t_1$. The input pulse 24 is then terminated and the clock pulse 22 is applied for the interval $t_1$ to $t_2$. For reasons previously described, the current build-up during the interval $t_1$ to $t_2$ is in accordance with the dashed curve 48. At time $t_2$ the current attains a magnitude $I_c$, corresponding to point 56. The difference between $I_c$ and $I_b$ is substantial, as will be realized when one considers that the logarithm of current is plotted in FIGURE 4.

It is thus seen that a small input pulse controls a large output current, and the diode circuit is thus capable of amplification. The amplifier is ideally suited for supplying high current to an output load 8 of low impedance because the impedance of the body 2 falls to a low value in response to impact ionization. Such a load may be, for example, a superconducting element. By way of example, a diode amplifier which was constructed and successfully operated had the following characteristics.

| | |
|---|---|
| Dimensions of body 2: | |
| Length | 368 mils (between electrodes). |
| Width | 118 mils. |
| Height | 32 mils. |
| Clock pulse | 16 volts, 500 millimicroseconds. |
| Input pulse | 8 volts, 20 millimicroseconds. |
| Load | 75 ohms. |
| Power gain | 22. |

The input and clock pulses were applied to the amplifier at the same time in the above example.

The diode amplifier also may be used to perform logical operations with gain at very high speed. For example, the amplifier may perform the logical "and" operation. An "and" circuit may be defined as a circuit having two inputs and one output, which has the property that a signal is obtained at the output if and only if both of the inputs are energized. When the amplifier is used as an "and" circuit, the clock pulse 22 represents one of the two inputs and the input pulse 24 the other input. The input pulses may be derived from computer circuits in a known manner.

What is claimed is:

1. The combination comprising a body of semiconductive material in which the number of charge carriers increases exponentially in response to an electric field of predetermined magnitude under certain conditions of ambient temperature, means for adjusting the temperature of said body to one of said conditions, a pair of ohmic contact electrodes affixed to said body, first means for applying energizing pulses between said electrodes for intermittently establishing an electric field greater than said predetermined magnitude, and second means connected in series with said first means for applying an input pulse between said electrodes for altering the rate at which said charge carriers increase.

2. The combination claimed in claim 1 wherein said input pulse is applied in time coincidence with one of said energizing pulses.

3. In combination, an impact ionization device in which the number of charge carriers increases exponentially with time in response to an electric field of greater than predetermined magnitude under certain conditions of ambient temperature; means for maintaining the temperature of said device at one of said conditions; means connected in series with said device for intermittently establishing an electric field across said device of greater than said predetermined magnitude; and means for applying an input pulse in series with said device for altering the rate at which said charge carriers increase.

4. A rise-time amplifier comprising, in combination: a body of extrinsic type semiconductor material in which the number of charge carriers increases exponentially with time due to impact ionization in response to an applied electric field of greater than predetermined magnitude under certain conditions of ambient temperature; means for maintaining the temperature of said body at one of said conditions; means for intermittently applying, in series with said body, first energizing pulses for establishing an electric field of greater than said predetermined magnitude; and signal input means connected in series with said body for altering the magnitude of the established field and the rate of charge carrier increase.

5. The combination comprising: a body of semiconductor material in which, under certain ambient temperature conditions, the charge carriers increase exponentially, due to impact ionization, at a rate determined by the amount by which an electric field across said body exceeds a predetermined magnitude; means for maintaining the ambient temperature at one of said conditions; a pair of ohmic contacts affixed to said body; first means for applying control signals intermittently between said electrodes to establish an electric field greater than said predetermined magnitude; signal input means connected in series with said first means for modulating said established electric field and the rate of said charge carrier increase; and an output load connected between said electrodes.

References Cited in the file of this patent

UNITED STATES PATENTS

| | | |
|---|---|---|
| 2,629,834 | Trent | Feb. 24, 1953 |
| 2,685,039 | Scarbrough et al. | July 27, 1954 |
| 2,740,940 | Becker et al. | Apr. 3, 1956 |
| 2,871,377 | Tyler | Jan. 27, 1959 |

OTHER REFERENCES

Publication: Sclar et al., "Impact Ionization of Impurities in Germanium," March 1957, in the Physics & Chemistry of Solids, pages 1–23.